(12) United States Patent
Neubauer et al.

(10) Patent No.: US 6,553,131 B1
(45) Date of Patent: Apr. 22, 2003

(54) LICENSE PLATE RECOGNITION WITH AN INTELLIGENT CAMERA

(75) Inventors: Claus Neubauer, Monmouth Junction, NJ (US); Jenn-Kwei Tyan, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/396,950

(22) Filed: Sep. 15, 1999

(51) Int. Cl.⁷ .................................................. G06K 9/00
(52) U.S. Cl. ...................................... 382/105; 382/170
(58) Field of Search ................................. 382/105, 205, 382/177, 278, 159, 173, 176, 291, 204, 218, 104, 170, 169, 171, 172; 340/907, 933, 937; 701/117

(56) References Cited

U.S. PATENT DOCUMENTS

| 4,567,609 A | * | 1/1986 | Metcalf | 382/105 |
| 5,651,075 A | * | 7/1997 | Frazier et al. | 381/105 |
| 5,809,161 A | * | 9/1998 | Auty et al. | 382/104 |
| 5,847,661 A | * | 12/1998 | Ricci | 340/902 |
| 6,141,620 A | * | 10/2000 | Zyburt et al. | 701/117 |
| 6,339,651 B1 | * | 1/2002 | Tian et al. | 382/105 |

* cited by examiner

Primary Examiner—Bhavesh M. Mehta
Assistant Examiner—Seyed Azarian (57) ABSTRACT

An intelligent camera system and method for recognizing license plates, in accordance with the invention, includes a camera adapted to independently capture a license plate image and recognize the license plate image. The camera includes a processor for managing image data and executing a license plate recognition program device. The license plate recognition program device includes a program for detecting orientation, position, illumination conditions and blurring of the image and accounting for the orientations, position, illumination conditions and blurring of the image to obtain a baseline image of the license plate. A segmenting program for segmenting characters depicted in the baseline image by employing a projection along a horizontal axis of the baseline image to identify positions of the characters. A statistical classifier is adapted for classifying the characters. The classifier recognizes the characters and returns a confidence score based on the probability of properly identifying each character. A memory is included for storing the license plate recognition program and the license plate images taken by an image capture device of the camera.

19 Claims, 5 Drawing Sheets

LICENSE PLATE RECOGNITION WITH AN INTELLIGENT CAMERA

BACKGROUND

1. Technical Field

This disclosure relates to optical recognition methods and systems and more particularly, to an intelligent camera for character recognition.

2. Description of the Related Art

Most image processing systems for industrial applications and video surveillance are still based on a personal computer (PC), a frame grabber and a separate CCD camera. PC based vision systems for traffic surveillance have been described in the prior art. In contrast to PC based systems intelligent or smart cameras are recently becoming more popular, since they offer several advantages. They require minimal space, because processor and sensor are integrated in one package. They are more robust and reliable in outdoor environments, they require less maintenance and they are well suited for cost sensitive applications. However, intelligent cameras offer less computational power, since they are typically one or two generations behind the current processor generation and they are limited with respect to main memory (e.g., 8 MB) and hard disk space (e.g., a 5 MB flash disk).

In principle, license plate recognition is may be similar to optical character recognition (OCR) for document processing. However, existing OCR engines cannot be successfully used as license plate readers because they cannot tolerate an extreme range of illumination variations, such as inhomogeneous illumination and shadows, blurring due to dirt, screws, particles, etc. In addition, OCR products are limited due of their memory and processing speed requirements.

Therefore, a need exists for versatile algorithms for applications that go beyond simple identification or measuring tasks. A further need exists for a system that reliably recognizes license plates for applications ranging from surveillance to automated systems for determination of the parking fees.

SUMMARY OF THE INVENTION

A method for recognizing license plates employing an intelligent camera with a processor and a memory, in accordance with the present invention, includes capturing an image including a license plate by the intelligent camera, and detecting a region in which the license plate is located by performing a coarse localization of the image. Orientation, position, and illumination conditions of the image are detected and accounted for to obtain a baseline image of the license plate. A fine localization of the baseline image is performed to obtain a more accurate depiction of vertical resolution of the baseline image of the license plate. Characters depicted in the baseline image are segmented by employing a projection along a horizontal axis of the baseline image to identify positions of the characters. The characters are classified based on a statistical classifier to obtain a confidence score for the probability of properly identifying each character. The above steps are recursively performed until each confidence score exceeds a threshold value to recognize the characters.

In alternate methods, the step of detecting orientation, position, and illumination conditions of the image and accounting for the orientations, position, and illumination conditions of the image to obtain a baseline image of the license plate may include the step of comparing each character in the image of the license plate with examples of images with different illuminations to account for illumination effects on the image. The step of detecting a region in which the license plate is located by performing a coarse localization of the image may include the steps of sub-sampling the image to reduce a number of pixels, extracting vertical edges in the image, generating a saliency map based upon the vertical edges to identify regions in the image with a probability of including the license plate and extracting a localization result which includes the image of the license plate. The step of segmenting characters depicted in the baseline image by employing a projection along a horizontal axis of the baseline image to identify positions of the characters may include the steps of providing a projection profile of pixel intensities across vertical lines of pixels in the baseline image, filtering the projection profile and identifying locations of characters in the baseline image depicted by area below a threshold value in the filtered projection profile.

The statistical classifier may employ a convolutional network, and the step of classifying the characters based on a statistical classifier to obtain a confidence score for the probability of properly identifying each character may include the step of training the classifier by employing virtual samples of characters. The method may include the step of comparing character blocks and characters to predetermined license plate codes and conventions to check accuracy of recognition. The step of recursively performing the method steps until each confidence score exceeds a threshold value may include the step of considering adjacent characters together to attempt to improve the confidence score. The above method steps may be implemented by a program storage device readable by machine, tangibly embodying a program of instructions executable by the machine to perform the method steps.

An intelligent camera system for recognizing license plates, in accordance with the invention, includes a camera adapted to independently capture a license plate image and recognize the license plate image. The camera includes a processor for managing image data and executing a license plate recognition program device. The license plate recognition program device includes means for detecting orientation, position, illumination conditions and blurring of the image and accounting for the orientations, position, illumination conditions and blurring of the image to obtain a baseline image of the license plate. The camera includes means for segmenting characters depicted in the baseline image by employing a projection along a horizontal axis of the baseline image to identify positions of the characters. A statistical classifier is adapted for recognizing and classifying the characters based on a confidence score, the confidence score being based on a probability of properly identifying each character. A memory is included for storing the license plate recognition program and the license plate image taken by an image capture device of the camera.

In alternate embodiments, a trigger device may be adapted to cause an image to be captured responsive to an event. The event may include an approach of a vehicle. The means for detecting may include examples of images with different illuminations to account for illumination effects on the image for each character within the image. The means for segmenting may include means for providing a projection profile of pixel intensities across vertical lines of pixels in the baseline image, a filter profile for filtering the projection profile and means for identifying locations of characters in the baseline image depicted by area below a threshold value in the filtered projection profile. The statistical classifier may includes one of a convolutional network and a fully connected multilayer perceptron. The memory may include a database for predetermined license plate codes and conventions for checking accuracy of recognition. The intelligent camera system may include a parking lot control system coupled to the intelligent camera system for determining parking fees based on character recognition of license plates.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention is directed to a robust intelligent character recognition system and method for determining characters under various conditions, for example, in different illumination conditions, at different angles, etc. In one particularly useful embodiment, the present invention is employed in license plate recognition.

A robust car identification system for surveillance of parking lot entrances that runs completely on a stand alone low cost intelligent camera is provided. To meet accuracy and speed requirements, hierarchical classifiers and coarse to find search techniques are applied at each recognition stage for localization, segmentation and classification.

The present invention provides an efficient hierarchical decomposition of a recognition task, where coarse segmentation and classification methods are applied. Ambiguous patterns may be forwarded to more sophisticated methods to achieve a desired recognition time (for example, 2–3 seconds based on an Intel™ 486/100 MHz processor). Given multiple segmentation hypotheses, the reliable recognition or rejection of segmented characters is one important aspect for the performance. The character recognition task is preferably accomplished by employing a convolutional network.

Figure 1:
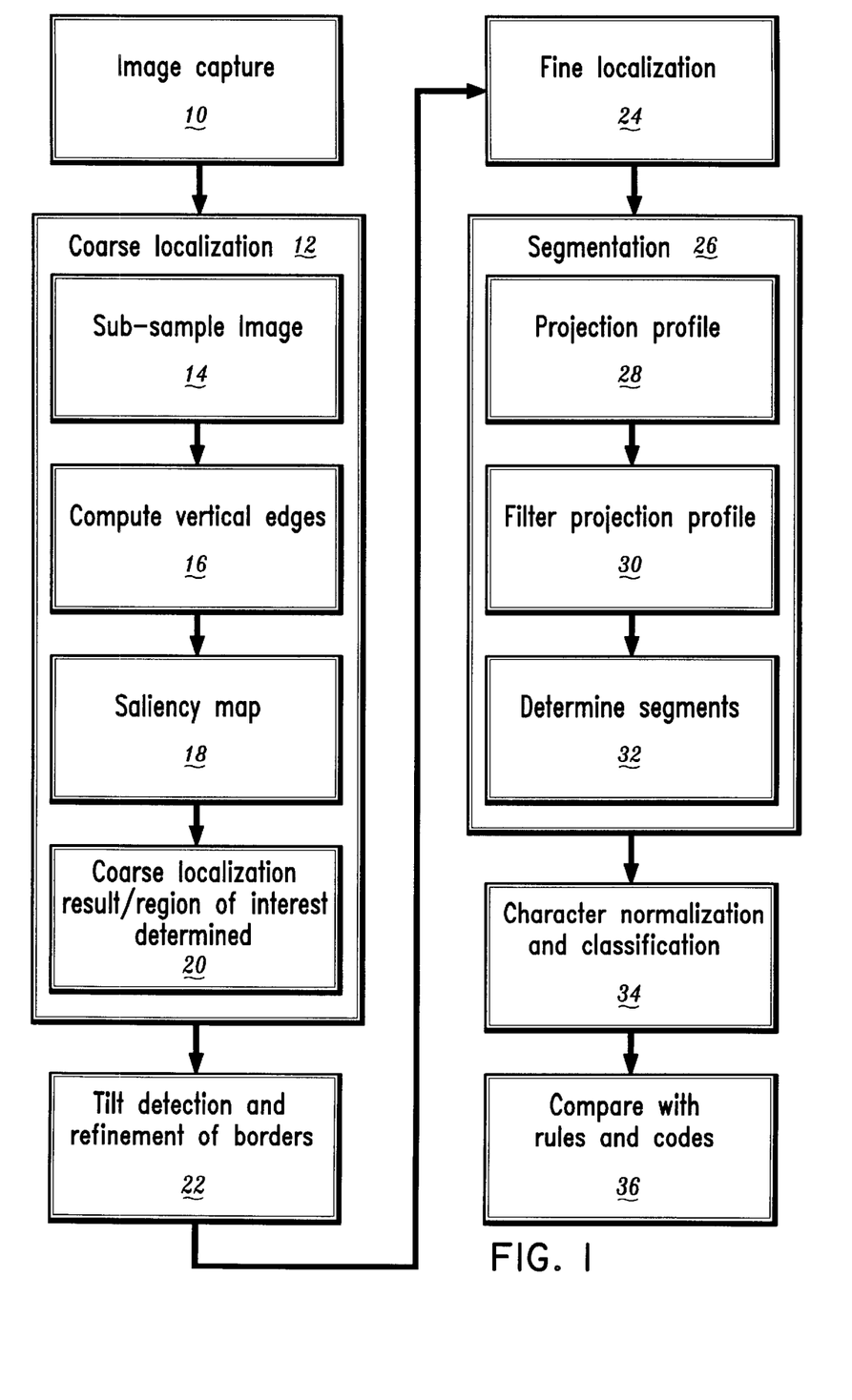
FIG. 1 is a block/flow diagram showing a system/method for employing an intelligent camera for license plate recognition in accordance with the present invention.
Figure 5:
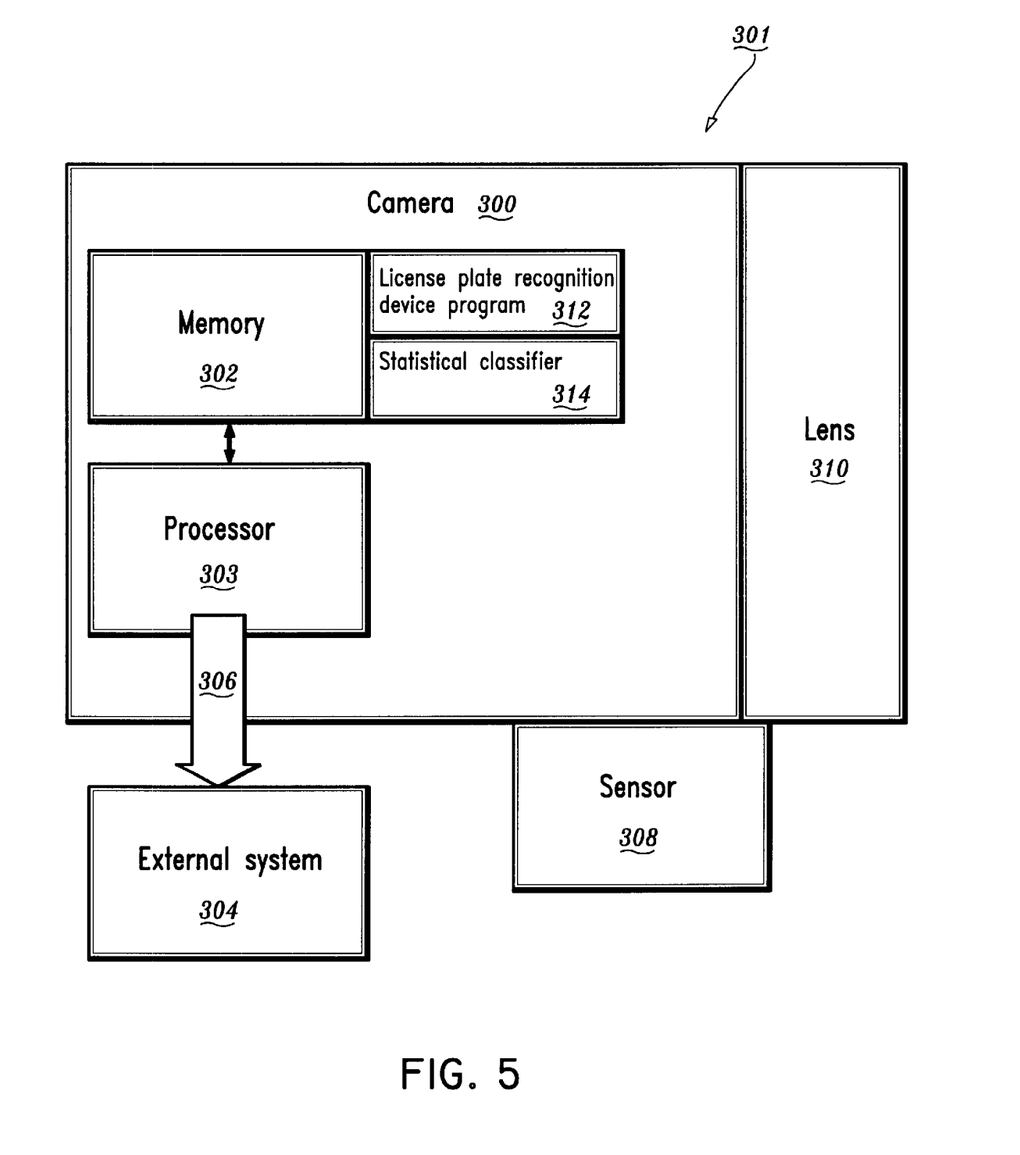
FIG. 5 is a block diagram of an intelligent camera in accordance with the present invention.
Figure 6:
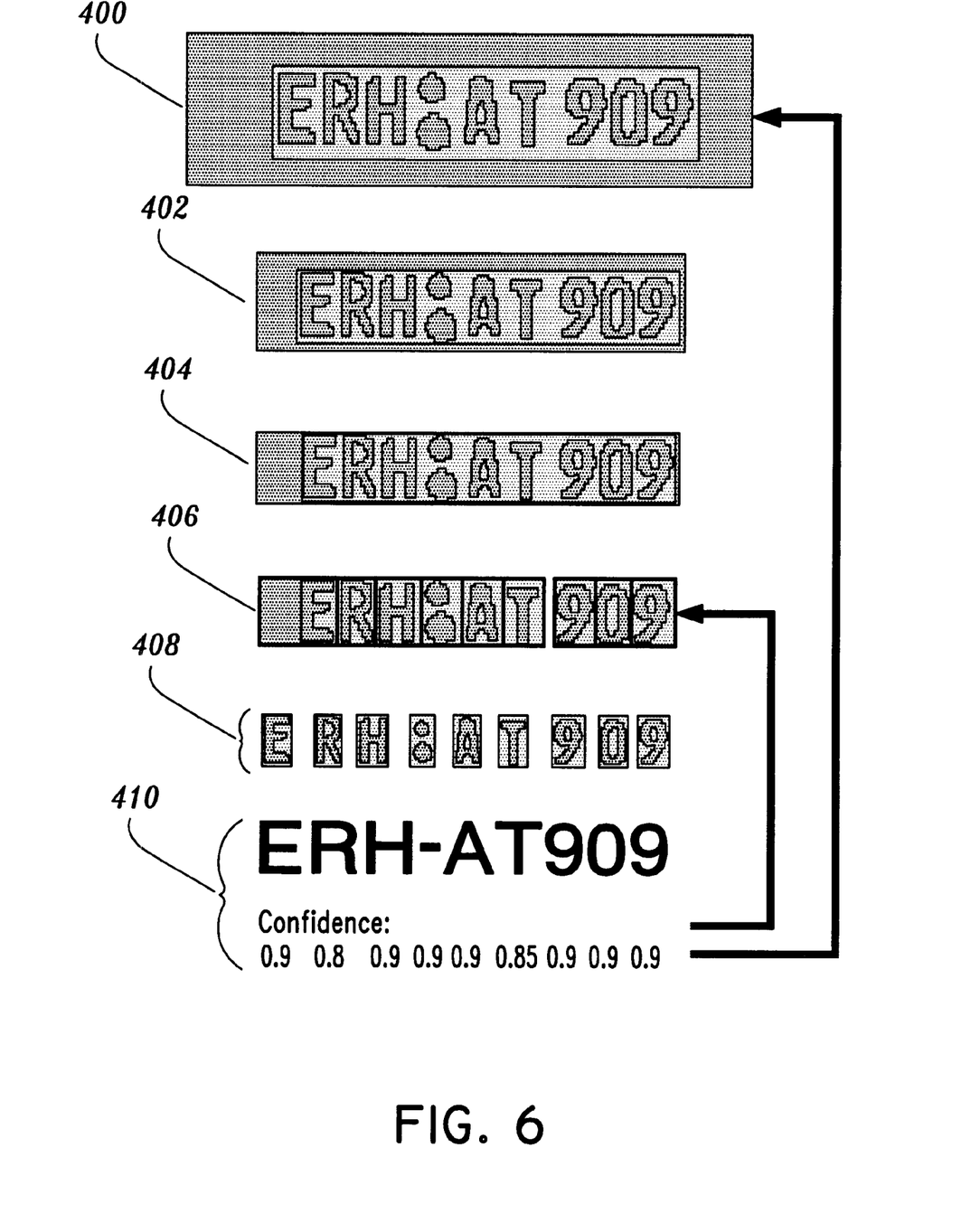
FIG. 6 depicts a license plate at various stages of processing in accordance with the present invention.

It should be understood that the elements shown in FIGS. 1, 5 and 6 may be implemented in various forms of hardware, software or combinations thereof. Preferably, these elements are implemented in software on one or more appropriately programmed general purpose digital processing unit having a processor and memory and input/output interfaces. Referring now in specific detail to the drawings in which like reference numerals identify similar or identical elements throughout the several views, and initially to FIG. 1, a flow diagram of an illustrative license plate recognition method is shown. In block 10, character identification is based, in one example, on frontal or rear views of the car to obtain an image of a license plate. For example, the car may be stopped in front of a gate. An inductive sensor may be employed to externally trigger image capture. In a preferred embodiment, the camera is fixed so that the orientation of the license plates is approximately constant. However, the size and position of the license plates can vary slightly due to the position and the type of car. The approaching car may be detected by the camera itself and the external inductive sensor trigger may be eliminated.

In block 12, a course localization is performed preferably based on multi-resolution analysis. Different resolutions of the image are checked to assist in character recognition of symbols or characters on the license plate. Coarse localization hones in on the license plate image within the image captured. This is performed by sub-sampling the image, in block 14, to reduce the number of pixels therein (i.e., to reduce computational complexity). In block 16, vertical edges are computed (since vertical edges dominate in license plates, however, horizontal edges may also be computed). Vertical edge computation determines vertically disposed pixel groups. In block 18, a saliency map is generated. A saliency map blends vertical edges to achieve intensity regions in the image. Highest peak values in the intensity regions have the highest probability of being the license plate and are selected for further processing. In block 20, the invention hones in on the image of the license plate to provide the course localization.

In block 22, tilt detection and refinement of an area of interest is determined. This includes addressing illumination effects, positions (distances away from the license plate, left and right borders), rotations, blurring and other effects. Comparisons to normalized correlation models or templates are performed to find similar illuminations, distances, etc. to attempt to reduce the effects on the image. Advantageously, this provides a robustness to the system which is not achieved by OCR algorithms.

In block 24, a fine localization based on local edge and regional features is performed, i.e., a vertical fine localization for license plates. After successful localization, multiple segmentation hypotheses are created by an algorithm, in block 26, based on nonlinear projections onto a baseline image. The nonlinear projections are employed in a profile, in block 28 (See FIG. 2B) and filtered in block 30 (See FIG. 2C). As a result, the left and right boundary of each character is determined, in block 32 (See FIG. 2D). In block 34, the recognition system preferably employs a convolutional neural network classifier or other statistical classifier, which identifies the characters and returns a confidence value for each character. Based on the confidence measure, the segmentation hypothesis with the highest overall confidence is accepted. After image analysis, a table of rules, for example, valid city codes and country specific rules are applied to verify, correct or reject strings, in block 36. For example, German license plates include two blocks with letters followed by one block with digits only and the overall number of characters may not exceed eight. These rules can significantly narrow the search and improve performance.

Localization of License Plates

In block 12, license plate localization is preferably based on multi-resolution analysis. The coarse localization relies on the fact that a license plate (text) includes a high amount of vertical edges compared to the remaining parts of a car and its surrounding in an image. Vertical edges are computed and a saliency map is generated on a reduced resolution. Pixels with high intensity in the saliency map correspond to positions that are likely to include the license plate. The highest peal value in the saliency map corresponds to the license plate. In rare instances other peaks may occur. In this case a candidate list of possible locations is ordered by the intensity of the vertical edge feature which is computed and evaluated until a reasonable result is found. This method provides a robust technique for localizing the license plate with images having size and orientation variations due to varying distance, position and type of license plate or car. Horizontal edges or other local features may be employed for coarse localization as well. Position and size variations as well as small rotations are accounted for by the system in block 22.

In block 24, after coarse localization, fine localization is performed. The orientation of the license plate is precisely determined and corrected. The left and right border of the license plate are detected. The height and position of the license plate within the image are determined to more accurately retrieve a region of interest. This refinement is, again, based on vertical edge features of the original image (not a sub-sampled image) to gain higher accuracy. After the position, orientation and size of the license plate are determined, the region of interest is resampled to a predetermined vertical resolution (e.g., 20 pixels). This resolution is maintained for subsequent steps to reduce computational overhead. Accurate positioning and size normalization along the vertical access improve the accuracy of segmentation and classification.

Segmentation of the Character String

Based on the position and size of the detected license plate the region of interest is extracted and re-sampled so that the vertical resolution is about 20 pixels for the character height, this may be adjusted depending on the application. The 20 pixel resolution for the character height was found to be sufficient for the subsequent segmentation and recognition as will be described.

In contrast to U.S. license plates the characters of German license plates are not equally spaced and the character width is strongly varying. Furthermore, two different fonts and layouts are used. While sophisticated segmentation algorithms like Hidden Markov Model, which are also successfully used for handwriting recognition or speech recognition, may perform better, here a simple segmentation based on projections to the baseline is advantageously employed to minimize execution time.

Figure 2A:
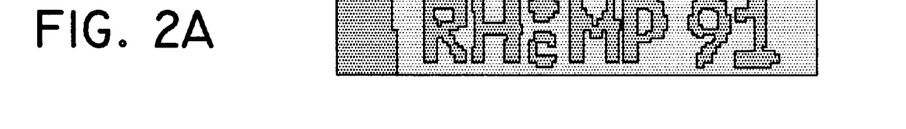
FIG. 2A is an image of a license plate.
Figure 2B:
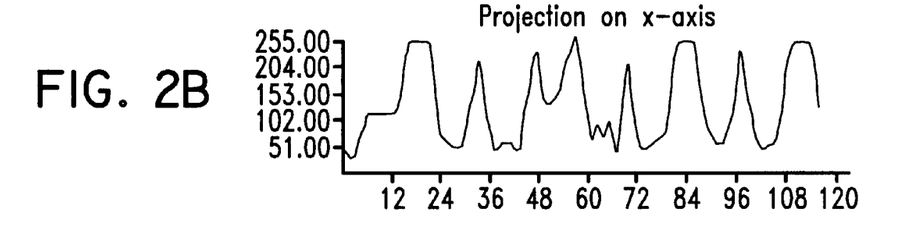
FIGS. 2B–2D show segmentation steps for segmenting the characters of the license plate image of FIG. 2A, in accordance with the present invention.
Figure 2C:
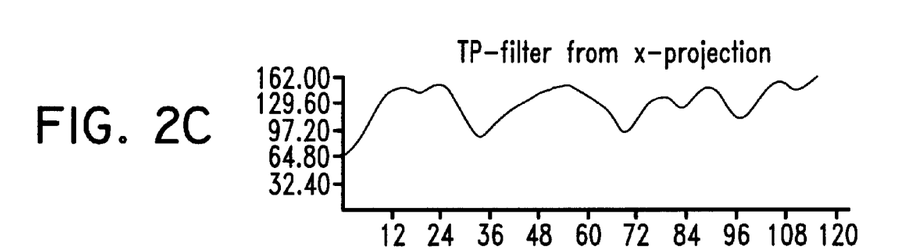
Figure 2D:
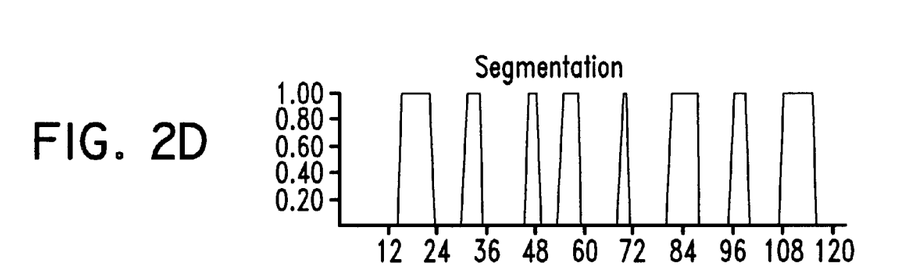

Referring to FIGS. 2A–D, segmentation steps for block 26 of FIG. 1 are illustratively depicted for a license plate 100 shown in FIG. 2A. Based on a central part of the region including the characters of FIG. 2A, a profile or projection is generated in FIG. 3B from right to left along the image, based on a darkest pixel in each column (in the y direction). FIG. 2B is a plot of pixel intensity (x-axis) versus column number (y-axis). A low pass filtered profile, for example, the profile depicted in FIG. 2C is subtracted from the profile in FIG. 2B resulting in a profile of FIG. 3D. In FIG. 2D, the areas or regions below a threshold (e.g., 1.00) each include a character.

Touching characters caused by dirt particles, image blurring and shadows that partially cover the license plate may cause problems for a projection-based segmentation and the peak between characters can become very small. Thus, the segmentation is preferably parameterized to be sensitive to spaces. The segmentation also detects many false positive spaces. If the classification of the segmented characters does not identify characters with high confidence, then a more powerful recognition based segmentation algorithm may be applied, as described in commonly assigned U.S. application Ser. No. 09/396,952, entitled "CHARACTER SEGMENTATION METHOD FOR VEHICLE LICENSE PLATE RECOGNITION", filed concurrently herewith and incorporated herein by reference.

Identification of Characters

Since the segmentation process itself is inherently ambiguous, it has to be tightly coupled to the character identification. Segmentation provides locations that are likely to include characters. Consequently, the overall performance depends highly on the performance of the character classifier and its ability to recognize valid characters and to reject invalid characters due to false positive segmentation, as performed in block 26 of FIG. 1. Several experiments have been conducted by the inventors to choose optimal classifiers for this problem. In one experiment, fully connected multi-layer perception and convolutional networks were employed. Experiments demonstrate the advantage of convolutional networks compared to the fully connected multilayer perception; however, either method may be used as well as equivalent methods.

For German license plate recognition, 40 classes have to be recognized (10 digits, 26 regular characters, 3 special German characters: ae, ue, oe; and the registration label appearing between first and second text field). Furthermore, negative examples caused by incorrect segmentation and localization were used for training. All neurons in an output layer of the convolutional networks should respond with zero activation to a negative input pattern. Negative patterns are particularly important to increase the rejection capability in case of a wrong segmentation. By increasing the number of negative samples compared to the number of valid characters the classifier is biased towards high rejection accuracy instead of using all its capacity for interclass separation.

Figure 3:
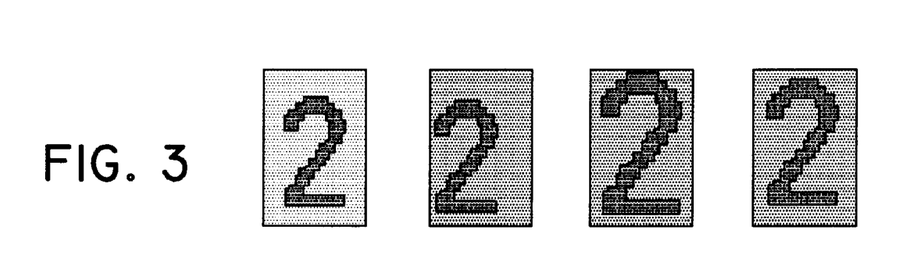
FIG. 3 depicts illustrative examples of virtual samples which may be employed in accordance with the present invention.

In addition to negative samples, virtual samples (VS) or templates improve the generalization of the classifier during training, if the training set has limited size. Virtual samples are generated from the original images by several affine transformations. In particular, the size, orientation and horizontal and vertical position of the characters may be varied randomly within a reasonable range (+/−2 pixel shift and +/−2% scaling, rotation<about 3 degrees) between training cycles and noise is added during training. With virtual samples, the classifier becomes more robust with respect to segmentation and location tolerances. Examples of virtual samples are illustratively shown in FIG. 3.

Since the segmentation may include false positive spaces, all combinations of character positions are considered, which are possible given a minimum and maximum width for the characters. The neural network evaluates the sub-images corresponding to these multiple hypotheses. The result of the neural network classification is a posterior probability of a class given an observation (see C. Bishop, *Neural Networks for Pattern Recognition*, Oxford Univ. Press, 1995). This probability may be used to choose the most likely combination of characters.

Before classification, each sub-image is normalized with respect to brightness and contrast. The sub-image preferably has a fixed size, for example, 16×20 pixels, so that wide characters like W still fit into the window. Very narrow characters like 'I' or '1' may cause problems, since neighboring characters are partly overlapping with their window. Therefore, the character width determined by the segmentation is employed to skip the left and right area beside the character and these pixels are set to a uniform background gray value.

Fully Connected Multilayer Perceptron

A three-layered perceptron (MLP)may be used for classification of characters and training by performing error back-propagation. The number of hidden neurons is varied manually for optimal generalization and about 100 hidden neurons was found to be preferred.

Convolutional Neural Network Based on Local Connections

Figure 4:
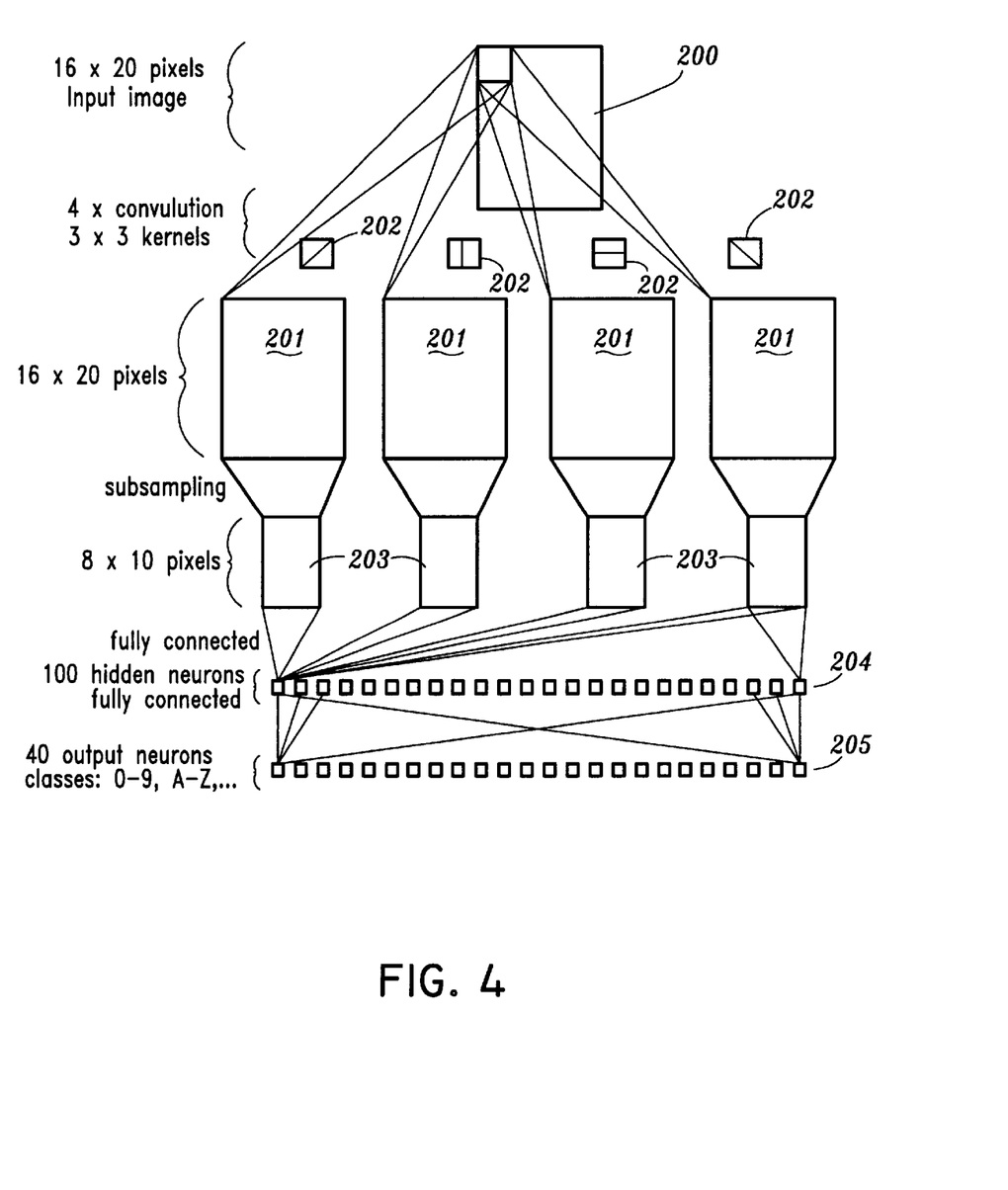
FIG. 4 is a schematic diagram of a convolutional network for employing the present invention.

Referring to FIG. 4, a topology of a convolutional network is illustrated. An input image 200 is presented. A first layer includes four planes 201 with, for example, 16×20 pixels. Four convolution kernels 202 of, for example, a 3×3 pixel window size are applied so that four edge orientations are extracted (diagonals, vertical and horizontal). A sub-sampling is performed to reduce the planes 201 by, say, a factor two to 8×10 pixels and pixel averaging is performed to obtain planes 203. After convolutional and sub-sampling, two fully connected layers, 204 and 205 follow with, for example, 100 and 40 neurons, respectively.

When the convolutional network is employed for classification of characters, pixels of the input image, i.e., a segmented character, are extracted into four most likely orientations (diagonals, vertical and horizontal). Each extraction is sub-sampled to reduce its size. Comparisons occur to decipher the characters and the best character (highest confidence character(s)) are output from the output neurons (e.g., 40 for German license plates).

Training for this network (determining weights of hidden and output neurons) is performed by error back-propagation and virtual samples, which are employed in a similar fashion as with MLP training. Virtual samples advantageously improve the systems accuracy. (See FIG. 3).

Results

To test the overall recognition performance 900 license plate images were processed in accordance with the invention. An overall recognition rate of 96% percent was obtained for the methods of the present invention as shown in Table 1.

TABLE 1

|  | Recognition rate [%] | Execution time [sec] Pentium II ™ 333 MHz | Execution time [sec] Intelligent camera |
| --- | --- | --- | --- |
| Localization | 98.0 | 0.10 | 1.0 |
| Segmentation, Character classification | 98.0 | 0.15 | 1.5 |
| Overall | 96.0 | 0.25 | 2.5 |

An average processing time of 2.5 sec on the target system was achieved by the intelligent camera of the present invention. In this case, the actual time may vary between about 2 and about 4 seconds depending on image quality and appearance of the license plate, however further improvements in processing time are contemplated. For bad images, more false positive segmentation hypotheses are created and have to be evaluated by the classifier. In one embodiment, localization consumes about forty percent of the execution time—segmentation and identification consume about sixty percent of the execution time.

Referring to FIG. 5, an intelligent camera system 301 is shown in accordance with the present invention. In one embodiment, the methods of present invention may be developed and optimized on a PC. The methods may be loaded on an intelligent camera 300, i.e., a camera capable of processing and storing a program. Camera 300 includes a memory 302 and one or more processors 303 for executing program steps. Memory 302 preferably stores a current image of a license plate and sub-images thereof. Also, license plate rules/codes (e.g., city codes) may be stored in memory 302 as well as trained weights of the neural network described above. Larger memories may include a plurality of images of license plates as well as other data. In one embodiment, intelligent camera 300, includes a Siemens VS 710 camera. The Siemens VS 710 camera uses an INTEL processor (486/100 MHz, 8 MB RAM, 4 MB flash disk serial and Profi-bus interface). An interface 306 may be adapted to work with an external system 304. External system 304 may include a parking lot control system which includes fee schedules, time in/out data, etc. for a given vehicle. Camera 300 is preferably compatible with a PC to permit license plate recognition methods to be downloaded and employed by camera 300. Therefore, the PC software written, for example, in C/C++ can be used on the camera without major adaptation. Routines for image capture and communication with the control system may have to be linked. Camera 300 may include a sensor 308 which triggers image capture through a lens 310 when a condition is sensed. For example, if a vehicle approaches a parking lot gate, an image is captured for the vehicles license plate. The license plate image is recognized by the above methods of the present invention (FIG. 1). Memory 302 may store the license plate information as well as other information, such as time in/out, etc. Advantageously, camera 300 may be placed remotely in a parking lot or other location without the need for a large processing system (a PC, etc.). In accordance with the invention, an automated license plate recognition system with high recognition accuracy is provided which includes a robust and low cost intelligent camera.

With an intelligent camera based on a more powerful processor, motion analysis may be employed to extend applications towards moving vehicles and various outdoor surveillance tasks. Camera 300 includes a license plate recognition program device 312 preferably implemented in software. License plate recognition program device 312 detects orientation, position, illumination conditions and blurring of the image and accounts for these effects in the image to obtain a baseline image of the license plate. License plate recognition program device 312 provides a segmentation of characters depicted in the baseline image by employing a projection along a horizontal axis of the baseline image to identify positions of the characters. A statistical classifier 314 is included and adapted for classifying the characters based on a confidence score for the probability of properly identifying each character to recognize the characters.

Referring to FIG. 6, an illustrative method is shown for a given license plate. Block 400 shows a license plate after coarse localization. In block 402, tilt detection and illumination effects are accounted for and further refinement of the image is performed. In block 404, vertical fine localization is performed reducing the number of pixels and focusing in on the license plate. In block 406, characters are segmented, and in block 408, the characters are classified. Once the individual characters are extracted, each sub-image is individually normalized with respect to illumination before being evaluated by the classifier. This accounts for different illuminations/shadows across the license plate. A confidence score is calculated in block 410. If the confidence score for a given character is less than a threshold value, re-segmentation is performed (block 406). Neighboring characters may be combined to determine a better score. Otherwise, the path returns to block 400. These steps may be iteratively executed until a better score is achieved.

Having described preferred embodiments for license plate recognition with an intelligent camera (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for recognizing license plates employing and intelligent camera with a processor and a memory, the method steps comprising:

capturing an image including a license plate by the intelligent camera;

detecting a region in which the license plate is located by performing a coarse localization of the image;

detecting orientation, position, and illumination conditions of the image and accounting for the orientations, position, and illumination conditions of the image to obtain a baseline image of the license plate;

performing a find localization of the baseline image to obtain a more accurate depiction of vertical resolution of the baseline image of the license plate;

segmenting characters depicted in the baseline image by employing a projection along a horizontal axis of the baseline image to identify positions of the characters;

classifying the characters based on statistical classifier to obtain a confidence score for the probability of properly identifying each character; and recursively performing the method steps until each confidence score exceeds a threshold value to recognize the characters, wherein the step of segmenting characters depicted in the baseline image by employing a projection along a horizontal axis of the baseline image to identify positions of the characters includes the steps of:

providing a projection profile of pixel intensities across vertical lines of pixels in the baseline image; filtering the projection profile; and identifying locations of characters in the baseline image depicted by area below a threshold value in the filtered projection profile.

2. A method for recognizing license plates; employing and intelligent camera with a processor and a memory, the method steps comprising:

capturing an image including a license plate by the intelligent camera;

detecting a region in which the license plate is located by performing a coarse localization of the image;

detecting orientation, position, and illumination conditions of the image and accounting for the orientations, position, and illumination conditions of the image to obtain a baseline image of the license plate;

performing a find localization of the baseline image to obtain a more accurate depiction of vertical resolution of the baseline image of the license plate;

segmenting characters depicted in the baseline image by employing a projection along a horizontal axis of the baseline image to identify positions of the characters;

classifying the characters based on statistical classifier to obtain a confidence score for the probability of properly identifying each character; and recursively performing the method steps until each confidence score exceeds a threshold value to recognize the characters, wherein the step of detecting orientation, position and illumination conditions of the image and accounting for the orientations, positions, and illumination conditions of the image to obtain a baseline image of the license plate includes the step of comparing each character in the image of the license plate with examples of images with different illuminations to account for illumination effects on the image.

3. A method for recognizing license plates employing and intelligent camera with a processor and a memory, the method steps comprising:

capturing an image including a license plate by the intelligent camera;

detecting a region in which the license plate is located by performing a coarse localization of the image;

detecting orientation, position, and illumination conditions of the image and accounting for the orientations, position, and illumination conditions of the image to obtain a baseline image of the license plate;

performing a find localization of the baseline image to obtain a more accurate depiction of vertical resolution of the baseline image of the license plate;

segmenting characters depicted in the baseline image by employing a projection along a horizontal axis of the baseline image to identify positions of the characters;

classifying the characters based on statistical classifier to obtain a confidence score for the probability of properly identifying each character; and recursively performing the method steps until each confidence score exceeds a threshold value to recognize the characters, wherein the step of detecting a region in which the license plate is located by performing a coarse localization of the image includes the steps of:

sub-sampling the image to reduce a number of pixels;

extracting vertical edges in the image;

generating a saliency map based upon the vertical edges to identify regions in the image with a probability of including the license plate; and extracting a localization result which includes the image of the license plate.

4. The method as recited in claim 1, wherein the statistical classifier employs a convolutional network and the step of classifying the characters based on a statistical classifier to obtain a confidence score for the probability of properly identifying each character includes the step of training the classifier by employing virtual samples of characters.

5. The method as recited in claim 1, further comprising the step of comparing character blocks and characters to predetermined license plate codes and conventions to check accuracy of recognition.

6. The method as recited in claim 1, wherein the step of recursively performing the method steps until each confidence score exceeds a threshold value includes the step of considering adjacent characters together to attempt to improve the confidence score.

7. An intelligent camera system for recognizing license plates comprising:

a camera adapted to independently capture a license plate image and recognize the license plate image including:

a processor for managing image data and executing a license plate recognition program device;

the license plate recognition program device including:
   means for detecting orientation, position, illumination conditions and blurring of the image and accounting for the orientations, position, illumination conditions and blurring of the image to obtain a baseline image of the license plate;
   means for segmenting characters depicted in the baseline image by employing a projection along a horizontal axis of the baseline image to identify positions of the characters;
   a statistical classifier adapted for recognizing a classifying and characters based on a confidence score, the confidence score being based on a probability of properly identifying each character; and
   a memory of storing the license plate recognition program and the license plate image taken by an image capture device of the camera;
wherein the means for segmenting includes:
   means for providing a projection profile of pixel intensities across vertical lines of pixels in the baseline image;
   a filter profile for filtering the projection profile; and
   means for identifying locations of characters in the baseline image depicted by area below a threshold value in the filtered projection profile.

8. The intelligent camera system as recited in claim 7, further comprising a trigger device adapted to cause an image to be captured responsive to an event.

9. The intelligent camera system as recited in claim 8, wherein the event includes an approach of a vehicle.

10. An intelligent camera system for recognizing license plates comprising:
   a camera adapted to independently capture a license plate image and recognize the license plate image including:
      a processor for managing image data and executing a license plate recognition program device;
      the license plate recognition program device including:
         means for detecting orientation, position, illumination conditions and blurring of the image and accounting for the orientations, position, illumination conditions and blurring of the image to obtain a baseline image of the license plate;
         means for segmenting characters depicted in the baseline image by employing a projection along a horizontal axis of the baseline image to identify positions of the characters;
         a statistical classifier adapted for recognizing a classifying and characters based on a confidence score, the confidence score being based on a probability of properly identifying each character; and
         a memory of storing the license plate recognition program and the license plate image taken by an image capture device of the camera,
         wherein the means for detecting includes examples of images with different illuminations to account for illumination effects on the image for each character within the image.

11. The intelligent camera system as recited in claim 7, wherein the statistical classifier includes one of a convolutional network and a fully connected multilayer perceptron.

12. The intelligent camera system as recited in claim 7, wherein the memory includes a database for predetermined license plate codes and conventions for checking accuracy of recognition.

13. The intelligent camera system as recited in claim 7, further comprising a parking lot control system coupled to the intelligent camera system for determining parking fees based on character recognition of license plates.

14. A program storage device readable by machine, tangible embodying a program of instructions executable by the machine to perform method steps for recognizing license plates employing an intelligent camera with a processor and a memory, the method steps comprising:
   capturing an image including a license plate by the intelligent camera;
   detecting a region in which the license plate is located by performing a coarse localization of the image;
   detecting orientation, position, and illumination conditions of the image and accounting for the orientations, position, and illumination conditions of the image to obtain a baseline image of the license plate;
   performing a fine localization of the baseline image to obtain a more accurate depiction of vertical resolution of the baseline image of the license plate;
   segmenting characters depicted in the baseline image by employing a projection along a horizontal axis of the baseline image to identify positions of the characters;
   classifying the characters based on statistical classifier to obtain a confidence score for the probability of properly identifying each character; and
   recursively performing the method steps until each confidence score exceeds a threshold value to recognize the characters,
wherein the steps of segmenting characters depicted in the baseline image by employing a projection along a horizontal axis of the baseline image to identify positions of the characters includes the steps of:
   providing a projection profile of pixel intensities across vertical lines of pixels in the baseline image; filtering the projection profile; and
   identifying locations of characters in the baseline image depicted by area below a threshold value in the filtered projection profile.

15. The program storage device as recited in claim 14, wherein the step of detecting orientation, position, and illumination conditions of the image and accounting for the orientations, position, and illumination conditions of the image to obtain a baseline image of the license plate includes the step of comparing each character in the image of the license plate with examples of images with different illuminations to account for illumination effects on the image.

16. A program storage device readable by machine, tangible embodying a program of instructions executable by the machine to perform method steps for recognizing license plates employing an intelligent camera with a processor and a memory, the method steps comprising:
   capturing an image including a license plate by the intelligent camera;
   detecting a region in which the license plate is located by performing a coarse localization of the image;
   detecting orientation, position, and illumination conditions of the image and accounting for the orientations, position, and illumination conditions of the image to obtain a baseline image of the license plate;
   performing a fine localization of the baseline image to obtain a more accurate depiction of vertical resolution of the baseline image of the license plate;
   segmenting characters depicted in the baseline image by employing a projection along a horizontal axis of the baseline image to identify positions of the characters;
   classifying the characters based on statistical classifier to obtain a confidence score for the probability of properly identifying each character; and recursively performing the method steps until each confidence score exceeds a threshold value to recognize the characters, wherein the step of detecting a region in which the license plate is located by performing a coarse localization of the image includes the steps of:
sub-sampling the image to reduce a number of pixels;
extracting vertical edges in the image;
generating a saliency map based upon the vertical edges to identify regions in the image with a probability of including the license plate; and
extracting a localization result which includes the images of the license plate.

17. The program storage device as recited in claim 14, wherein the statistical classifier employs a convolutional network and the step of.classifying the characters based on a statistical classifier to obtain a confidence score for the probability of properly identifying each character includes the step of training the classifier by employing virtual samples of characters.

18. The program storage device as recited in claim 14, further comprising the step of comparing character blocks and characters to predetermined license plate codes and conventions to check accuracy of recognition.

19. The program storage device as recited in claim 14, wherein the step of recursively performing the method steps until each confidence score exceeds a threshold value includes the step of considering adjacent characters together to attempt to improve the confidence score.

* * * * *